(12) United States Patent
Mori

(10) Patent No.: US 9,844,203 B1
(45) Date of Patent: Dec. 19, 2017

(54) SYSTEM TO TOILET-TRAIN A HOUSE PET

(71) Applicant: Tyrus Mori, Mt. Prospect, IL (US)

(72) Inventor: Tyrus Mori, Mt. Prospect, IL (US)

( * ) Notice: Subject to any disclaimer, the term of this patent is extended or adjusted under 35 U.S.C. 154(b) by 313 days.

(21) Appl. No.: 14/545,503

(22) Filed: May 13, 2015

(51) Int. Cl.
*A01K 1/01* (2006.01)
*A01K 15/02* (2006.01)

(52) U.S. Cl.
CPC .......... *A01K 1/0121* (2013.01); *A01K 15/02* (2013.01)

(58) Field of Classification Search
CPC .................................... A01K 1/0121
USPC ....................................... 119/162
See application file for complete search history.

(56) References Cited

U.S. PATENT DOCUMENTS

| 2,053,594 | A | * | 9/1936 | Albert | .................. | A01K 1/0121 |
| | | | | | | 119/162 |
| 5,103,772 | A | * | 4/1992 | Schmid | ................ | A01K 1/0121 |
| | | | | | | 119/162 |
| 5,640,928 | A | * | 6/1997 | Rymer | .................. | A01K 1/0121 |
| | | | | | | 119/162 |
| 7,536,733 | B2 | | 5/2009 | Berube | | |
| 7,762,213 | B2 | | 7/2010 | Cook et al. | | |
| 2002/0078899 | A1 | * | 6/2002 | Chiu | ..................... | A01K 1/0121 |
| | | | | | | 119/162 |
| 2007/0017023 | A1 | | 1/2007 | Berube et al. | | |
| 2009/0211530 | A1 | | 8/2009 | Yu | | |
| 2011/0185976 | A1 | | 8/2011 | Egy | | |

FOREIGN PATENT DOCUMENTS

| DE | 3627570 A1 | * | 2/1988 | .......... A01K 1/0121 |
| EP | 2 071 941 A2 | * | 6/2009 | |
| GB | 2338722 A | * | 12/1999 | .......... A01K 1/0121 |

* cited by examiner

*Primary Examiner* — Ruth Ilan

(57) ABSTRACT

An invention engaged in a program or system to toilet-train a house pet in two or three stages after which said pet will routinely relieve itself into the toilet bowl. The initial embodiment may be in an outdoor venue, as in the case of a dog. The second stage may commence in the bathroom, on the floor, where the owner will continue the training program. Ultimately, the preferred embodiment will be resting atop the toilet seat or the toilet bowl rim where the trainee will deposit its excreta directly, without hesitation or ceremony.

13 Claims, 3 Drawing Sheets

Figure 1:
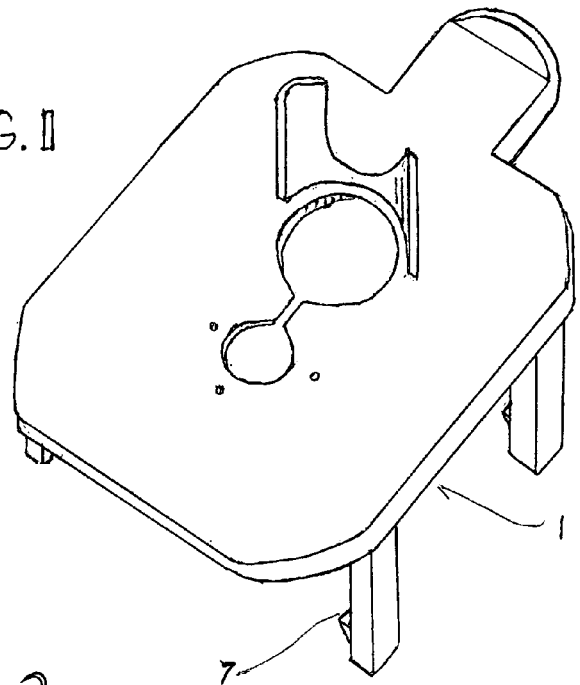

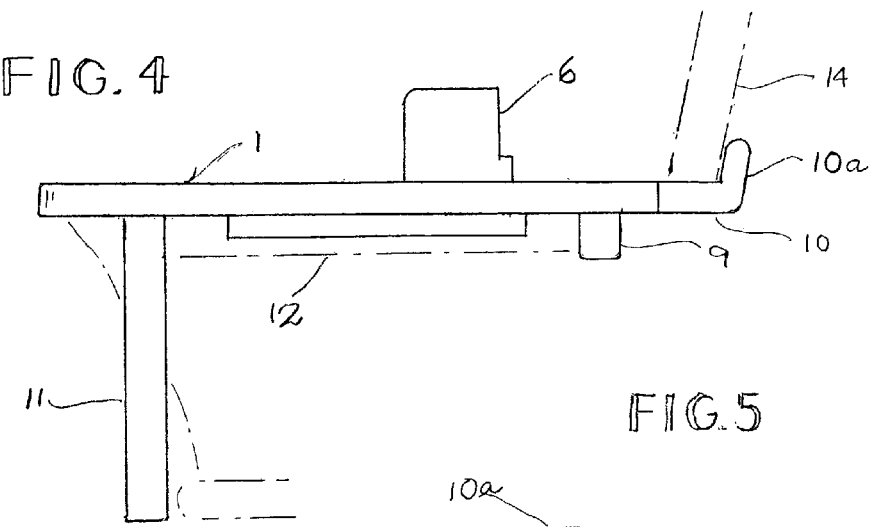
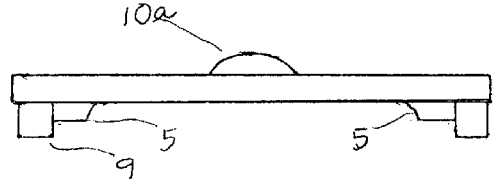
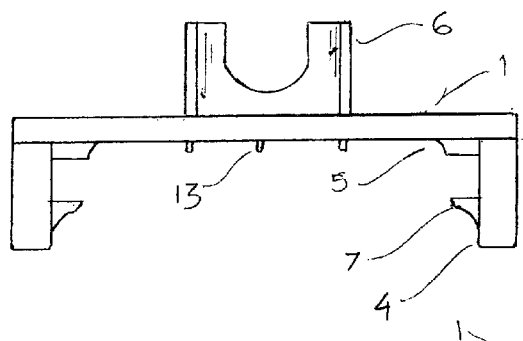
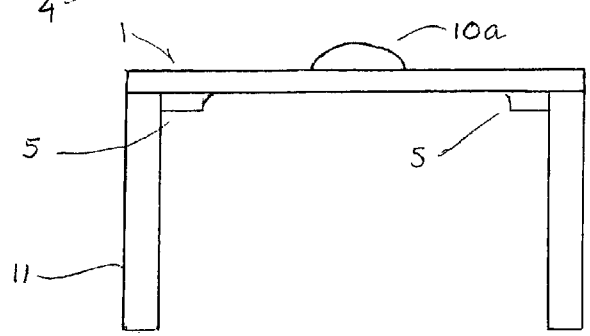

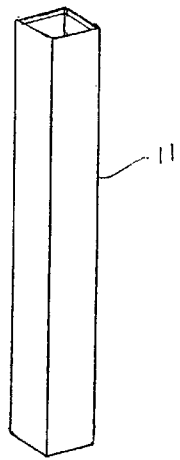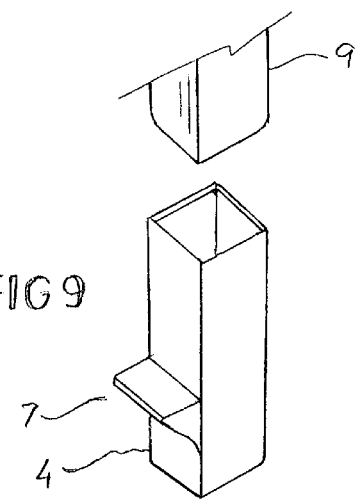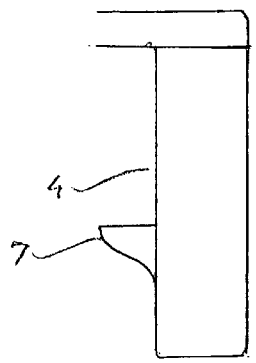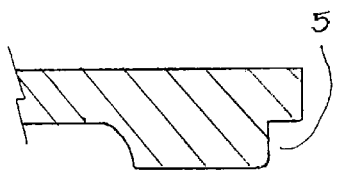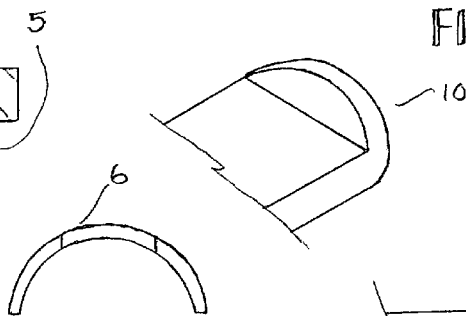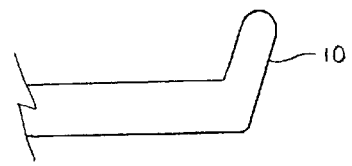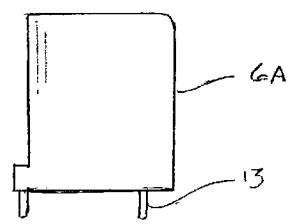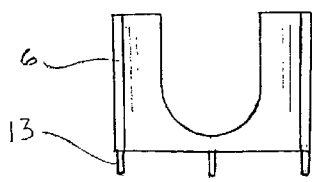

SYSTEM TO TOILET-TRAIN A HOUSE PET

CROSS REFERENCE TO RELATED APPLICATIONS

N A

STATEMENT REGARDING FEDERALLY FUNDED RESEARCH OR DEVELOPMENT

N A

BACKGROUND OF THE INVENTION

The term "house-broken" as it applies to a domestic pet usually means the employment of one of a great number of devices, methods or systems to manage pet excreta. In reference to a feline, it generally means the pet is "paper-trained" or it uses a "cat litter box". The material commonly there used is designed to "clump" and, of course, it's highly absorb-ent, but there is always the consideration of the time involved and the cost of the litter. And in spite of the owner's efforts, there often times is the acrid odor of cat urine; sometimes unknown to the owner. The owner must keep the litter box presentable or the pet will find a clean area of its own to relieve itself, creating another problem.

For nearly a century there have been countless documented efforts to deal with the by-products of a house pet, and yet they all may have their own peculiar disadvantages and/or shortcomings.

In the last ten years there appear to be some art with the toilet more directly involved. Although not great in numbers, the prior art in this field or class related to "cat litter box" suggest a more linear route from the pet to the garbage can or toilet.

US 2007/0017023 Berube has a platform fixed to the toilet bowl rim for a direct deposit. There are, however, two wing bolts and other hardware involved which suggest an issue with the installation and removal of the device. 2001/0211530 Yu engages the toilet bowl whereby a flappable grid is attached to the toilet seat and cover. The arrangement of the grid over the bowl may require the a brush with water or other liquid on a regular basis. The invention nevertheless has its advantages.

20011/0185976 Egy has the device with rotatable scoops or cups in a supporting frame with clay material over the toilet bowl; flushing kitty litter down the toilet may present drainage problems in the long run.

Although there are other house pets, including dogs and other four legged creatures its ironic that the prior art seem to be directed toward the cat which is typically a neat and fastidious creature. The present invention is directed toward the problem of other house pets as well.

House pets, dogs, cats, ferrets and others are oftentimes not given due credit for their innate and acquired intelligence. The present embodiment proposes more emphasis to be put on the conditioning and training of the pet and less "training" of the owner.

SUMMARY OF THE INVENTION

The present invention relates to a system to train a house hold pet to routinely use a toilet, instead a box on the floor, to relieve itself.

The system involves a two or three step process in the training culminating with the preferred embodiment to be situated atop the toilet bowl rim where the pet will make its direct deposit After "paper-training" the pet, indoors or outside, the invention will be placed over the area where the pet customarily used. Some sheets of toilet paper with a trace of excreta and a few grains of kitty litter might be useful, with an underlayment of a non-porous material.

In a preliminary embodiment, again with a hint of excreta on the toil paper more or less in the center of the opening used, the platform will be raised above the floor four or five inches of the floor by mean of the attachable legs; this embodiment will have easier access underneath for the pet owner.

Once the pet becomes conditioned to the location and the raised height, the invention can be relocated to its preferred embodiment, atop the toilet bowl.

In an alternate embodiment the platform can have its extended legs attached to the front fixed legs in that they support the front end of the platform as they rest on floor, with perhaps a larger scaled platform.

In an optional embodiment a tray or shelf can be located under the platform supported by the four ledges on the inner surface s of the four moderate length leg to provide an intermediate surface to receive the pet excreta.

BRIEF DESCRIPTION OF THE INVENTION

Figures 2, 3:
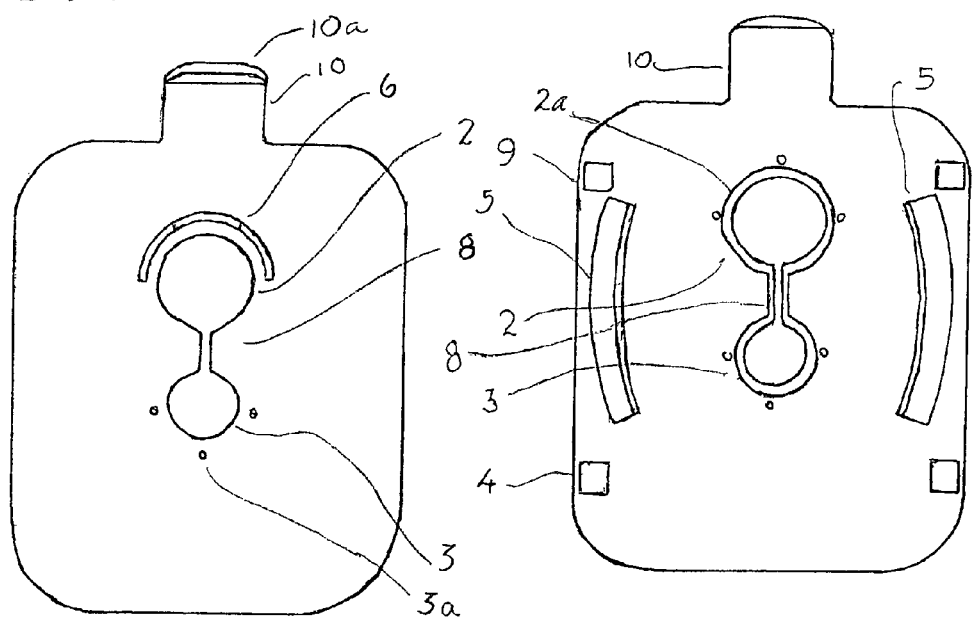

FIG. 1 is a perspective view of the present embodiment featuring a view of the rear barrier FIG. 2 is a plan view of the top surface of the platform, with the rear barrier installed FIG. 3 is a plan view of the under surface of the platform, thereof FIG. 4 is a right elevation view of the platform with floor legs attached FIG. 5 is a rear view of the platform FIG. 6 is a front elevation view of the platform with the moderate length legs and the rear barrier attached FIG. 7 is a rear elevation view of the platform with the floor legs attached FIG. 8 is a perspective view of a floor leg, thereof FIG. 9 is a detail of a moderate length leg showing how it attaches to a fixed leg FIG. 10 is a right side elevation of a moderate length attachable leg with a side view of a ledge on Its inner surface FIG. 11 is a cross-section view of the ridge on the underside of the platform FIG. 12 is right perspective view of the retaining tab FIG. 13 is a right elevation view of the tab on the front edge of the tongue FIG. 14 is a top plan view of an attachable barrier, large or small FIG. 15 is a left side elevational view of a barrier, large or small FIG. 16 is a front elevational view of either barrier, both large or small, as they differ only in size and are otherwise identical

DETAILED DESCRIPTION OF THE INVENTION

In reference to the Brief Description page in this application, the components of the present invention are herein described:

A substantially flat platform 1 constructed of a liquid impermeable material that in a preferred embodiment, is situated atop a conventional toilet bowl rim 12 wherein a house pet will deposit its excreta routinely.

Within the central area of the platform 1 are two circular openings; a larger opening 2 at the rear central area of the platform 1 and a smaller circular opening 3 located at the near central area of the platform.

Said openings, large and small, have diameters that are greater at the bottom side of the platform than the respective diameters of both openings on the top surface of the platform 1. Conversely, the diameters of both large and smaller openings are smaller at the top surface of the platform 1 than the diameters of both respective holes at the bottom surface of the platform.

Between the centrally located larger hole 2 at the rear central section of the plat form 1 and the centrally located smaller hole at the near side of the platform is a slot opening 8 of a nominal width, from the top surface of the platform through to the bottom side thereof.

Between the larger hole 2 and the nearer smaller hole 3 is an area to the left of the slot and a similar area to the right of the slot 8; both areas incline laterally in a nominal slope to the centrally located slot 8.

At the rear central perimeter of the larger hole 2 is positioned a concave barrier 6 that maintains a nominally consistent margin at and around the periphery of said hole 2

In a likewise fashion, a comparatively smaller concave barrier 6a is situated at and around the near perimeter of the smaller opening 3; said smaller barrier 6a with a nominal margin around the periphery of the smaller hole.

In this arrangement the barriers are in an obverse relationship, facing each other.

Said barriers are affixed to the surface of the platform 1 by means of a plurality of dowels 13 on the underside of the barriers that fit into and through accommodating holes 3a in the surface of the platform 1.

The preferred embodiment rests atop the toilet bowl rim 12 and is secured thereon by means of a projection or tongue 10 at the rear central edge of the platform that is inserted under the raised toilet seat and seat cover and between the hinge assemblies thereof.

At the forward edge of the tongue is a projection or tab 10a that rises in an upward and rearward manner form the surface of the tongue 10 at an angle in agreement, more or less, with the angle of an upright toilet seat cover Said tab 10a is as wide as the tongue 10 and is of nominal height and thickness and has an arched top.

The tab 10a retains its obtuse angle at its rear surface down to the bottom edge of the platform.

Thus designed with its rounded corners and edges of the tab, the platform is easily installed and remove from the top of the toilet bowl rim 12.

On the undersurface of the platform 1 are four fixed legs 9 of nominal length to provide some separation of the platform from the bathroom floor or outdoor terrain.

DETAILED DESCRIPTION OF THE INVENTION

In an alternate embodiment, four legs 4 of a more moderate length are attached onto and over the fixed legs 9 in a slideable manner for easier access below the platform 1.

On the inner or inboard surface of the four legs 4, when attached, are projections or ridges 7 that are of dimensions sufficient to support a shelf and/or tray at an intermediate height for easier access below the platform.

Additionally, two floor legs 11 of an extended length are attachable to the two front fixed legs 4 In the same manner as the previous four legs 4. Said legs 11, when attached, offer the platform 1 more stability on the toilet bowl rim, if needed.

It should be noted that the aforementioned barriers, intermediate legs and the floor legs can be readily removed from the platform to enhance the portability of the invention and minimize the costs of manufacturing and shipping.

On the undersurface of the platform 1 are two ridges 5 situated longitudinally along the right side and the left side of the platform 1 in a front to rear orientation; said ridges 5 are of a concave or curved nature and are perhaps two or three inches proud of the surface of the platform 1.

Said ridges 5 on the underside of the platform 1 are perhaps six or seven inches in length; their concavity may restrict any extreme movement of the platform on the bowl rim.

After a brief review of the description and illustration of the present embodiment, a person skilled in the art might well conclude the viability and practicality of the invention cannot be denied and may warrant further discussion; the novelty of a pet toilet-training apparatus that substantially covers a conventional toilet fixture with its ample surface and the tongue and tab features for convenient installation and removal of the platform and the openings with their restraining barriers are the makings of a simple and efficient design of a system to train a pet to use a conventional toilet with regularity.

With regard to this disclosure in its entirety, it is to be realized that the dimensional and positional relationships of the various components of the present embodiment to include variations in size, material used, shape, form, texture, manner of usage and assembly are deemed readily apparent and obvious to someone skilled in the art and all equivalent relationships to the illustrations in the drawings and descriptions in the Specification are intended to be encompassed by the present invention. Further, although numerous modifications and changes may readily occur to one skilled in the art, it is not desired to limit the invention to the exact construction and operation as shown, and accordingly, all suitable modifications may be considered as falling within the scope and spirit of the invention.

I claim:

1. A system to toilet train a house pet comprising: a flat platform constructed of liquid impermeable material that has two openings in its central area; wherein the two openings comprise a smaller circular opening located on a near side of a larger circular opening the larger circular opening located on a far side of the smaller circular opening; wherein said platform is dimensionally superior to a toilet bowl and features four fixed legs of minimal length providing support; wherein said system further comprises two concave barriers, one larger concave barrier located at and around a far central periphery of the larger circular opening and one smaller concave barrier at and around a near central periphery of the smaller circular opening.

2. The system to toilet train a house pet of claim 1, wherein both openings in the flat platform have larger circular openings on an under surface of the platform than respective circular openings at a top surface of the platform.

3. The system to toilet train a house pet of claim 1, wherein said barriers maintain a constant marginal proximity to and around the central periphery of their respective openings; said barriers in an obverse arrangement, facing each other, when installed.

4. The system to toilet train a house pet of claim 1, wherein said barriers have U-shaped cutouts in central sections thereof, said cutouts extending from top edges of said barriers down to a point above bottom edges thereof.

5. The system to toilet train a house pet of claim 1, wherein said barriers are fixed into and through a surface of the platform by a plurality of dowels that are insertable into accommodating holes at the peripheries of each circular opening.

6. The system to toilet train a house pet of claim 1, further comprising a slot opening of a nominal width that traverse directly from the periphery of the larger circular opening to the periphery of the smaller circular opening, throughout the thickness of the platform, centrally.

7. The system to toilet train a house pet of claim 6 wherein said slot opening is beveled such that the slot opening is of a wider measurement at a bottom surface of the platform than at the top surface of the platform.

8. The system to toilet train a house pet of claim 1, wherein said platform has two attachable floor legs of an extended length that fix onto and over two of the fixed legs in a slideable manner; such legs, when installed, have a surface of the top of the legs in direct contact with a bottom surface of the platform.

9. The system to toilet train a house pet of claim 1, wherein said platform has two longitudinal concave ridges on a underside surface; one concave ridge in proximity to a left edge and the other concave ridge in proximity to a right edge of the platform in a front to rear orientation, thereof.

10. The system to toilet train a house pet of claim 9, wherein said ridges have a length whereby their extremities approach the fixed legs on an underside of the platform without surpassing said fixed legs, laterally or longitudinally.

11. The system to toilet train a house pet of claim 9, wherein said concave ridges are one or two inches proud of the surface of the platform and about two inches in width.

12. A system to toilet train a house pet comprising: a flat platform constructed of liquid impermeable material that has two openings in its central area; wherein the two openings comprise a smaller circular opening located on a near side of a larger circular opening, the larger circular opening located on a far side of the smaller circular opening; wherein said platform is dimensionally superior to a toilet bowl and features four fixed legs of minimal length providing support and wherein said platform has at rear central section a tongue; said tongue dimensioned to enable it to be inserted under a seat and seat cover assembly of a toilet and between the hinge assemblies thereof, on the surface of the toilet bowl, wherein the tongue has an arched-top tab at the insertable rear edge thereof that rises from a top surface of the platform in an upward and rearward obtuse angle; said angle in agreement with an angle of an upright seat cover.

13. A system to toilet train a house pet comprising: a flat platform constructed of liquid impermeable material that has two openings in its central area; wherein the two openings comprise a smaller circular opening located on a near side of a larger circular opening, the larger circular opening located on a far side of the smaller circular opening; wherein said platform is dimensionally superior to a toilet bowl and features four fixed legs of minimal length providing support and further comprising four attachable legs of a moderate length to fit onto and over the fixed legs of the platform in a slideable fashion with the top surface of the mounted legs in contact with the undersurface of the platform and further including ledges on inboard surfaces of the attachable legs, when attached, with dimensions sufficient to support a shelf or tray.

\* \* \* \* \*